(12) United States Patent
Schmack et al.

(10) Patent No.: US 11,716,001 B2
(45) Date of Patent: Aug. 1, 2023

(54) STATOR AND METHOD FOR PRODUCING A STATOR OF AN ELECTRIC MACHINE

(71) Applicant: Dr. Ing. h.c. F. Porsche Aktiengesellschaft, Stuttgart (DE)

(72) Inventors: Tobias Schmack, Stuttgart (DE); Andreas Lober, Westheim (DE)

(73) Assignee: Dr. Ing. h. c. F. Porsch AG, Stuttgart (DE)

( * ) Notice: Subject to any disclaimer, the term of this patent is extended or adjusted under 35 U.S.C. 154(b) by 55 days.

(21) Appl. No.: 17/366,028

(22) Filed: Jul. 2, 2021

(65) Prior Publication Data
US 2022/0006370 A1 Jan. 6, 2022

(30) Foreign Application Priority Data
Jul. 6, 2020 (DE) ............ 10 2020 117 740.2

(51) Int. Cl.
*H02K 15/12* (2006.01)
*H02K 15/10* (2006.01)
*H02K 3/34* (2006.01)
*H02K 3/24* (2006.01)

(52) U.S. Cl.
CPC ............ *H02K 15/125* (2013.01); *H02K 3/24* (2013.01); *H02K 3/345* (2013.01); *H02K 15/105* (2013.01)

(58) Field of Classification Search
CPC ...... H02K 15/105; H02K 15/125; H02K 3/24; H02K 3/345; H02K 3/522; H02K 3/48; H02K 15/065; H02K 3/34; H02K 3/50; H02K 15/12
See application file for complete search history.

(56) References Cited

U.S. PATENT DOCUMENTS

| 6,140,733 A | * | 10/2000 | Wedde | H02K 3/40 |
| | | | | 310/196 |
| 9,537,364 B2 | * | 1/2017 | Ishida | H02K 3/40 |
| 2012/0169172 A1 | * | 7/2012 | Anderton | H02K 3/30 |
| | | | | 310/214 |
| 2019/0363601 A1 | * | 11/2019 | Kneidl | H02K 15/064 |

FOREIGN PATENT DOCUMENTS

| DE | 10 2018 112 347 | 11/2019 |
| EP | 2 475 076 | 7/2012 |
| JP | 2017-127063 | 7/2017 |
| JP | 2018-174634 | 8/2018 |

OTHER PUBLICATIONS

German Examination Report dated Jul. 15, 2021.

* cited by examiner

*Primary Examiner* — Leda T Pham
(74) *Attorney, Agent, or Firm* — Gerald E. Hespos; Michael J. Porco

(57) ABSTRACT

A method for producing a stator (20) of an electric machine is provided. The method includes providing a stator (20) with at least one stator slot (22) that is bounded by two stator teeth. The method proceeds by introducing electrical conductors (30) into the at least one stator slot (22). At least one conductor (30) has an expandable coating (25) applied partially to its surface. The method continues by activating the expandable coating (25) to bring about an expansion of the coating (25), as a result of which the conductors (30) are fixed within the stator slot (22).

11 Claims, 3 Drawing Sheets

STATOR AND METHOD FOR PRODUCING A STATOR OF AN ELECTRIC MACHINE

CROSS REFERENCE TO RELATED APPLICATION

This application claims priority under 35 USC 119 to German Patent Appl. No. 10 2020 117 740.2 filed on Jul. 6, 2020, the entire disclosure of which is incorporated herein by reference.

BACKGROUND

Field of the Invention

The invention relates to a method for producing a stator of an electric machine, and also to a stator produced in accordance with the method.

Related Art

Electric machines rely open electromagnetic induction between rotors and stators to convert electrical power into mechanical power (electric motor) and vice versa (generator). Contemporary electric vehicles use electric machines with an efficiency of far above 90%. However, the conductors through which current flows during operation experience power losses due to lost heat. Heat that is not dissipated sufficiently has a negative effect on the power efficiency and the service life of the electric machine. Machines having a power of a few hundred kW usually use a water cooling system to dissipate the heat losses that occur at high power.

There are two approaches for cooling an electric machine, and these approaches may be employed together. For example, a jacket cooling system directs heat from the conductors in the slot via the stator toward a flow channel on the outer diameter of the stator. Additionally or alternatively, the cooling medium may flow directly through the slot so that the cooling medium absorbs the heat directly from the conductors as the point of origin and dissipates the heat from there. This approach is referred to as direct cooling.

Electric motors with direct cooling of the winding must keep a clear flow cross section adjoining the winding to accommodate a flow of the cooling medium. Many electric motors rely upon impregnation or potting with resin to fix the conductors in the slots so that conductors cannot move relative to one another. However, such impregnation or potting with resin could impede the flow of coolant and generally is not used in electric motors that rely upon direct cooling. Conductor/conductor movement or conductor/laminated core movement will damage the primary insulation on the conductors and cause failure of the electric machine. Thus, the individual conductors or conductor bars must be fixed in some other way.

EP 2 475 076 A1 discloses an expandable coating to fix the conductors of a stator. More particularly, the stator has a stator core with stator slots and electrical conductors are arranged in the stator slots. An expandable tape is wrapped around the conductors and is expanded by heat.

The conventional construction within a stator slot makes uses a slot base paper, the conductors and usually a resin impregnation or a full potting with resin. The impregnation normally is the last manufacturing step of the stator and is carried out after the steps of pin joining (if plug-in coils are used), widening, bending and contact-connecting of the conductors. The resin may be introduced onto the conductors by trickling, dipping, dip-rolling, vacuum potting or overmolding. Thus, the resin performs the function of the winding fixing.

The object of this invention is to provide a simplified method for producing a stator and of a correspondingly produced stator that has efficient cooling and that can be operated at high powers in particular for long periods of time.

SUMMARY

This specification relates to a method for producing a stator of an electric machine. The method comprises providing a stator with at least one stator slot that is bounded by two stator teeth. The stator may comprise a laminated core and, as is common in electric machines, such as those electric vehicles. The stator has slots (for example 54 slots) that are separated from one another by teeth. The following description focuses on one stator slot within the stator since this is sufficient for the explanation of the invention.

The method further comprises introducing electrical conductors into the respective stator slots. At least one conductor has an expandable coating applied partially to its surface. The fact that at least one conductor arranged within the slot has the coating of partial design may mean that this is the case for several conductors, for example for 25% of the conductors or for 50% of the conductors or more, for instance for 75% of the conductors, for almost all of the conductors or for all of the conductors that run through a slot. The conductors may be conductor bars.

Applying an expandable coating partially on the surface of the at least one conductor means that the coating is not arranged on the entire surface on a longitudinal portion of the conductor but rather covers only parts of this surface. In this respect, the expandable coating can be referred to as a structured coating of the conductor, since the coating is not arranged homogeneously on the surface of the conductor. Rather, the coating is applied inhomogeneously in that, along an observed longitudinal portion of the conductor, some surface parts are coated and other surface parts are not coated. The structured coating may be present in a predetermined pattern, for example a pattern that repeats along the length of the conductor. A longitudinal surface portion of a conductor means the entire, full surface of the conductor between a start point and an end point along the longitudinal axis of the conductor. The distance between the start point and end point may correspond approximately to the length of a stator slot. According to the invention, the partial design of the coating on the conductor may relate to the longitudinal surface portion that is arranged in the slot after the conductor has been inserted into this slot. Consequently, the length of the longitudinal portion may correspond approximately to the length of the stator slot. The regions of the conductor that protrude from a slot in each case on the end and bottom may have, but do not have to have, the same analogously designed partial coating.

An expandable coating, as used herein, is a coating that can be activated and, as a result, increases in volume, preferably, but not necessarily, primarily in a direction substantially perpendicular to the surface on which the coating is arranged. The expandable coating may be activated in different ways, for example thermally, chemically, electromagnetically or mechanically. The increase in volume of the expandable coating in the (permanently) activated state may be up to 100%. The activation of the expandable coating that has already been arranged "on site", that is to say on the surface of the at least one conductor, leads to an increase in its volume. This operation can be referred to as "in situ" impregnation, in accordance with the impregnation operation in the prior art, by means of which the fixing of the conductors is carried out. The expandable coating may be one or more of several different materials. Polymer materials, for example expandable polymer foams, silicone, thermoplastics or thermoset foams, in particular epoxy resins, may be used, to mention one exemplary choice.

The method comprises activation of the expandable coating to bring about an expansion of the coating and to fix the conductors within the stator slot.

The method is characterized in that, instead of an impregnation operation that usually occurs late in the prior art manufacturing methods for fixing the winding, the at least one conductor of the stator disclosed herein has a partial expandable coating. The expandable coating is distinguished by an increase in volume when activated. The increase in volume has the effect that the conductors (conductor bars) cling to the laminated stator core and, as a result, are clamped from the outside. The partial coating of at least one conductor on regions arranged in the slot forms flow channels within the stator slot. The flow channels make it possible to apply a controlled pressure difference to achieve direct cooling by a cooling fluid.

Numerous advantages are attributed to this disclosed production method. First, prevention or at least drastic reduction of chafing rub between the conductors makes it possible to protect their primary insulation, making it possible to prolong the service life of the stator. In addition, direct cooling of the conductors has a positive effect on the service life of the stator, particularly if a sufficiently high number of conductors, or even all conductors, have the partial coating, so that each conductor is cooled directly.

A further advantage is that the method omits the step of impregnating the conductors, thereby simplifying the production method. As a result, it is possible to use more favorable and less complex plant engineering for the production of the stator.

Furthermore, the value chain is optimized, since coating of the conductors is carried out to the start of the manufacturing chain instead of in the impregnation process.

A further advantage is that the fixing of the winding within the slots can be effected prior to the subsequent manufacturing steps, such as widening, twisting and contact-connecting. As a result, these manufacturing steps are carried out on conductors that are already fixed, thereby simplifying the component handling.

In some embodiments, the expandable coating may be activated by heat.

In some embodiments, after the coating has been expanded, at least one continuous fluid connection (flow channel) runs through the stator slot. This fluid connection is formed by regions of the surface of the at least one conductor that are not covered with the coating. For this purpose, the coating may be arranged partially in a corresponding structure or in a corresponding pattern on the surface in a (coherent) longitudinal region of the conductor such that, along the length of the conductor, uncoated regions of the conductor surface provide at least one flow channel.

In some embodiments, the production method comprises providing the conductors for the formation of the winding of the stator and coating at least one of the conductors with the expandable coating. The coating may be applied to the surface of the conductor either partially or in a full-area manner. In the latter case, the part of the coating subsequently is removed to achieve the partial coating of the conductor.

In further embodiments, the expandable coating applied to the surface of at least one conductor may be structured in such a way that, between regions of the conductor that protrude from the stator after the conductors have been inserted into the stator slot, there is at least one continuous path that runs on an uncoated surface of the conductor. In the finished state of the stator, and each such path defines a flow channel.

The partial coating may be arranged in the form of a spiral staircase-like structure on the surface of the at least one conductor. In this case, the cooling fluid channel runs around the conductor in a correspondingly spiral manner.

The partial coating may be arranged in plural layers that are separate from one another on the surface of the at least one conductor in such a way that, between regions of the conductor which protrude from the stator and protrude beyond the stator slot after the conductors have been inserted into the stator slot, there are continuous paths that run on an uncoated surface of the conductor.

The invention also relates to a stator for an electric machine. The stator has at least one stator slot bounded by two stator teeth. The stator further comprises electrical conductors that run within the at least one stator slot. The conductors are fixed within the stator slot and a surface of at least one conductor arranged within the stator slot is covered partially with an expanded coating. The surface of the conductor is, as defined above, a coherent full area along a longitudinal region of the conductor. The stator may be produced by the method described herein.

The stator may comprise at least one fluid connection that runs through the at least one stator slot. The fluid connection is formed by regions of the surface of the at least one conductor that are not covered with the coating.

According to further embodiments, a method of cooling a stator uses at least one conductor having a partial coating with an expandable material for formation of a winding of a stator. The partial coating is structured in such a way that uncoated regions of the conductor surface are arranged such that at least one path runs through them and connects two regions that are spaced apart from one another in a longitudinal direction of the conductor to one another. Expressed differently, the uncoated regions of the conductor surface are arranged such that they form at least one channel that connects two regions that are spaced apart from one another in a longitudinal direction of the conductor. In this case, the channel does not necessarily have to be dedicated and/or rectilinear, but rather may have branches and/or splittings. From a topological standpoint, it is important that, on the surface of the conductor, there is at least one connection between two regions that are spaced apart from one another in a longitudinal direction of the conductor, with the connection running on an uncoated surface of the conductor.

The features mentioned above and the features yet to be discussed below may be used not only in the respectively specified combination but also in other combinations or individually without departing from the scope of the present invention.

Further advantages and configurations of the invention emerge from the description and from the appended drawing.

DETAILED DESCRIPTION

Figure 1:
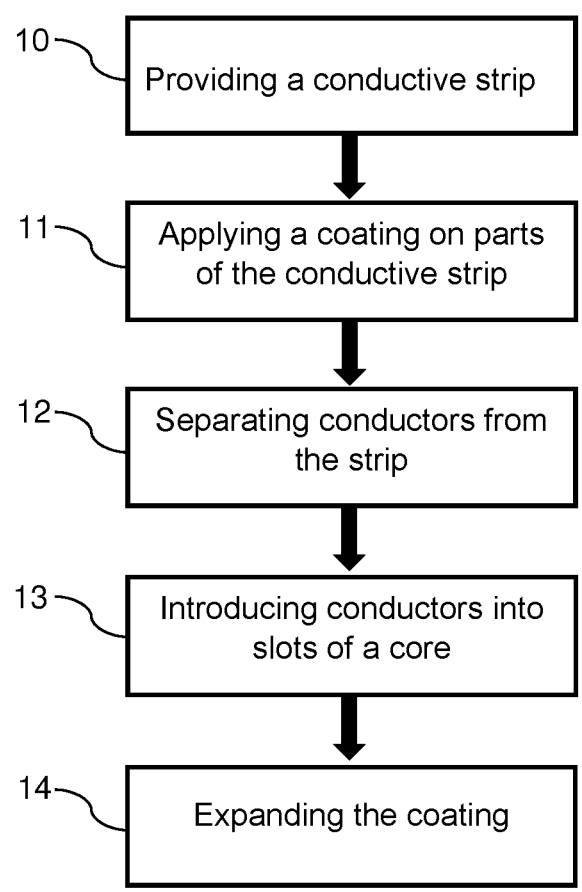
FIG. 1 shows a flow diagram in which one exemplary embodiment of the method according to the invention is illustrated.

One embodiment of the method of the invention is illustrated in FIG. 1. In a first step 10, the method comprises providing a conductor coil, for example a copper conductor coil, onto which the conductor has been wound. In this step, the coil is unwound for preparatory purposes.

Step 11 includes partial coating a part of the conductor strip that corresponds to the at least one conductor with the partial expandable coating.

Step 12 includes producing the required conductors by separating/severing the conductors from the conductor strip, it being possible here to provide the conductors in the correct length. If a plug-in coil is used, this step may also include the production of the so-called hairpins (hairpin-shaped conductors) by way of corresponding bending of straight conductor pieces.

Step 13 includes forming the winding of the stator by way of introduction/arrangement of the conductors in the slots of the laminated stator core.

Step 14 includes activating the partial expandable coating on the at least one conductor to expand the coating and thus fix the conductors within the stator slot.

Although the embodiment of the method outlined in FIG. 1 contains the specific steps for producing the conductors used for the construction of the winding of the stator, these steps are optional from the perspective of the invention, since suitably configured conductors may be acquired from a supplier, and therefore the production method may begin with the provision of a stator and the introduction of the prefabricated conductors into the stator slot. Consequently, the method according to the invention may begin essentially at step 13 of the embodiment illustrated in FIG. 1.

Figure 2A:
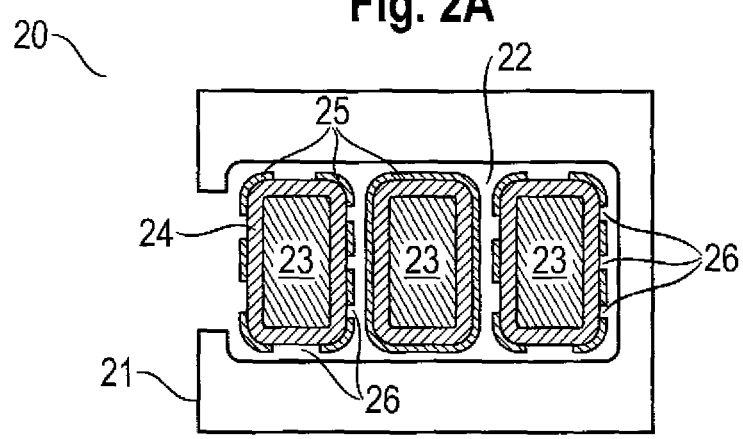
FIGS. 2A and 2B show a simplified illustration of a stator produced using the method of the invention, before and after activation of the partial expandable coating.
Figure 2B:
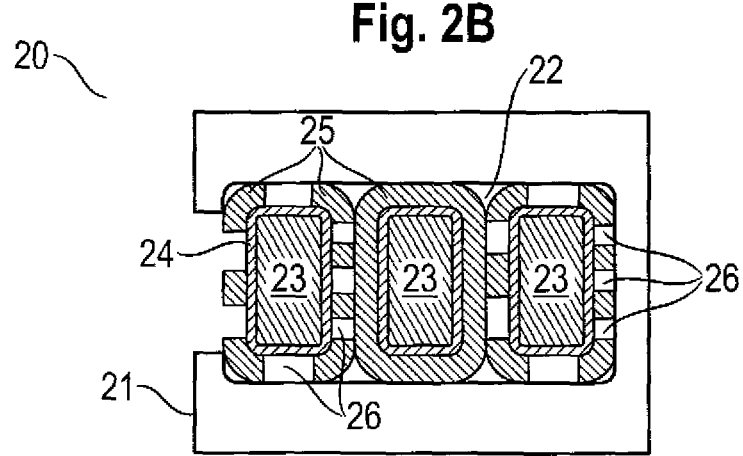

FIGS. 2A and 2B show a simplified schematic illustration of a stator 20 produced using the method of the invention, before (FIG. 2A) and after (FIG. 2B) activation of the partial expandable coating, respectively.

In FIG. 2A, partially coated and fully coated conductors have been introduced into a stator slot 22 of the laminated stator core 21. Each conductor comprises a conductor core 23, which may for example comprise copper, and an insulation layer 24. Furthermore, two of the three conductors have a partial, that is to say a partial or incomplete, coating 25, while one conductor is covered completely in full with the coating 25. The partially coated conductors are distinguished in that uncoated regions 26 are present on their surface. It should be emphasized that the configuration illustrated in FIG. 2A shows a greatly simplified scenario that is merely exemplary with regard to the number, design and arrangement of the partially and completely coated conductors. For example, practically all of the conductors used may have a partial expandable coating, and the coating patterns on each conductor may be identical or different.

The expandable layer 25 in FIG. 2A is in its non-activated, that is to say non-expanded form. It is therefore possible for the conductors to be introduced into the slot 22 without, or with low, frictional resistance. By contrast, FIG. 2B illustrates the state of the stator 20 after the expandable coating 25 has been activated. As a result of the activation, the expandable coating 25 has experienced a change in volume, such that the individual conductors are fixed within the slot 22. In this case, the uncoated regions 26 form flow channels which provide a connection between the end side and the bottom side of the stator 21 through the slot 22. The inlets to the flow channels on both sides may be, but do not have to be, uniquely assigned to a respective flow channel.

Figure 3A:
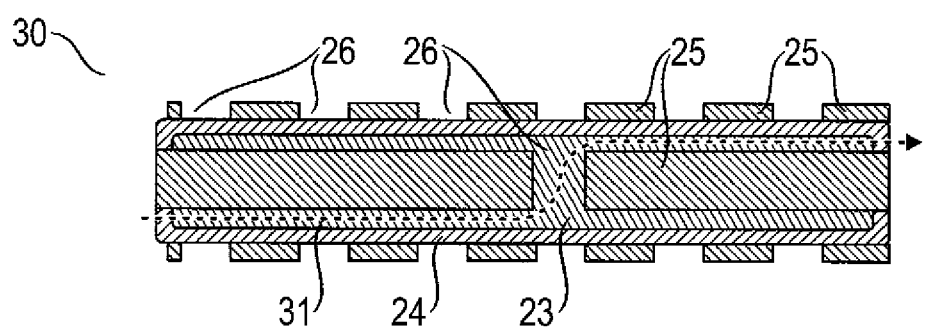
FIGS. 3A and 3B show two exemplary conductors that may be used in the context of the method of the invention for formation of the winding of the stator.
Figure 3B:
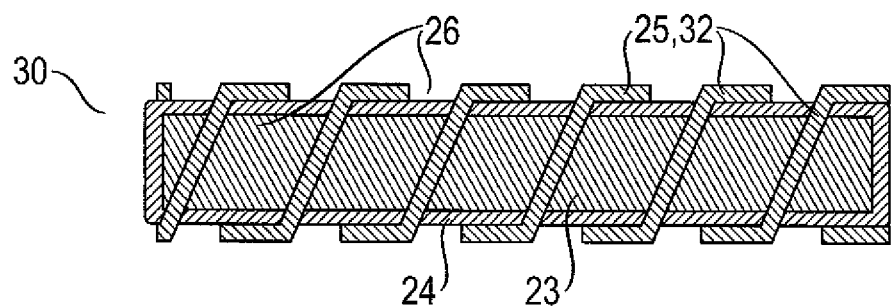

FIGS. 3A and 3B show two exemplary conductors 30 that may be used in the context of the method according to the invention to form the winding of the stator 20. As in FIG. 2A and 2B, each conductor 30 likewise comprises a conductor core 23 and an insulation layer 24. The conductor 30 shown in FIG. 3A has a segmented partial coating 25 with plural discrete layers of the coating material 25. Between the left and right ends of the conductor 30, a fluid can flow along paths formed by regions 26 that are not coated with the expandable material. The regions of the conductor 30 referred to here as ends may be understood to mean regions that are spaced apart from one another in a longitudinal direction of the conductor (30). Such an exemplary flow path is illustrated in FIG. 3A by the arrow 31.

FIG. 3B illustrates a further example of a structured partial coating 25 of a conductor 30 with the expandable material 25. In this example, the partial coating 25 is in the form of a line which forms a spiral staircase-like structure 32 around the conductor 30. The region 26 that is not coated with the expandable material correspondingly forms a coherent region, which is likewise arranged in a helical or spiral staircase-like manner around the conductor 30. This coherent region constitutes a continuous connection between the left and right ends of the conductor 30 and can consequently be used as a cooling fluid channel.

What is claimed is:

1. A method for producing a stator of an electric machine, comprising:
    providing electrical conductors;
    applying an expandable coating to selected spaced apart surface areas of at least one of the electrical conductors;
    providing the stator with at least one stator slot that is bounded by two stator teeth;
    introducing the electrical conductors into the at least one stator slot, so that the at least one of the electrical conductor having the expandable coating applied to the selected spaced apart surface areas is engaged loosely in the at least one stator slot; and
    activating the expandable coating to bring about an expansion of the expandable coating and thereby fixing the electrical conductors within the at least one stator slot while forming at least one continuous fluid path between opposite ends of the at least one stator slot by regions of the at least one of the electrical conductors having no coating applied thereto.

2. The method of claim 1,
    wherein the step of activating the expandable coating is carried out by supplying heat.

3. The method of claim 1, wherein after activating the expandable coating and fixing the electrical conductors within the at least one stator slot, the method further comprising:
    performing at least one subsequent manufacturing step selected from: widening the electrical conductors, twisting the electrical conductors and contact connecting the electrical conductors.

4. The method of claim 1,
    wherein the expandable coating is applied to plural spaced apart locations to form a spiral shaped continuous fluid path between opposite ends of the stator on the selected spaced apart surface areas of at least one of the electrical conductors.

5. The method of claim 1,
wherein the expandable coating is arranged in the form of plural layers that are separate from one another on the selected spaced apart surface areas of at least one of the electrical conductors in such a way that, between regions of the electrical conductor protruding from the stator after the electrical conductors have been inserted into the at least one stator slot, there are continuous paths that run on an uncoated surface of the electrical conductor.

6. A method for producing a stator of an electric machine, comprising:
providing at least first and second electrical conductors;
applying an expandable coating entirely to surfaces of the at least first and second electrical conductors;
removing the expandable coating from selected regions of the first electrical conductor without removing the expandable coating from the second electrical conductor;
providing a stator with at least one stator slot that is bounded by two stator teeth;
introducing the at least first and second electrical conductors into the at least one stator slot so that the at least first and second electrical conductors and the expandable coating disposed thereon are positioned loosely in the at least one stator slot;
activating the expandable coating to bring about an expansion of the expandable coating and thereby fixing the at least first and second electrical conductors within the at least one stator slot while forming at least one continuous fluid path by the selected regions of the first electrical conductor having no coating thereon.

7. The method of claim 6,
wherein after activating the expandable coating, the method further comprises performing at least one subsequent manufacturing step selected from: widening the at least first and second electrical conductors, twisting the at least first and second electrical conductors and contact connecting the at least first and second electrical conductors.

8. The method of claim 6, further comprising:
providing a third electrical conductor;
applying an expandable coating entirely to surfaces of the third electrical conductor;
removing the expandable coating from selected regions of the third electrical conductor;
introducing the third electrical conductor into the at least one stator slot so that the second electrical conductor is between the first and third electrical conductors and so that the first, second and third electrical conductors with the expandable coating disposed thereon are positioned loosely in the at least one stator slot; and
the step of activating the expandable coating brings about an expansion of the expandable coating on the third electrical conductor in addition to the expansion of the expandable coating on the first and second electrical conductors while forming at least one continuous fluid path by the selected regions of the first and third electrical connectors having no coating thereon.

9. A method for producing an electric machine, comprising:
providing electrical conductors;
causing an expandable coating to be affixed to first selected surface areas of the electrical conductors while causing second selected surface areas of the electrical conductors to have no expandable coating, thereby forming partly coated electrical conductors;
providing a stator with at least one stator slot that is bounded by two stator teeth;
delivering the partly coated electrical conductors and the stator to an electric machine assembly location;
introducing the partly coated electrical conductors into the at least one stator slot so that the partly coated electrical conductors are engaged loosely in the at least one stator slot;
activating the expandable coating to bring about an expansion of the expandable coating sufficiently to fix the electrical conductors within the stator slot, wherein the second selected surface areas that have no expandable coating are disposed to form at least one continuous fluid path between opposite ends of the at least one stator slot.

10. The method of claim 9, wherein the step of causing the expandable coating to be affixed to the first selected surface areas of the electrical conductors while causing the second selected surface areas to have no of the expandable coating, comprises applying the expandable coating entirely to both of the first and second selected surface areas of the electrical conductors; and then removing the expandable coating from the second selected surface areas of the electrical conductors.

11. The method of claim 10, wherein after activating the expandable coating, the method further comprises performing at least one subsequent manufacturing step selected from: widening the electrical conductors, twisting the electrical conductors and contact connecting the electrical conductors.

* * * * *